United States Patent [19]
Lesher

[11] 3,761,509
[45] Sept. 25, 1973

[54] N,N'-ALKYLENEBIS(4-SUBSTITUTED-BENZAMIDES)
[75] Inventor: George Y. Lesher, Schodack, N.Y.
[73] Assignee: Sterling Drug Inc., New York, N.Y.
[22] Filed: Feb. 25, 1971
[21] Appl. No.: 119,028

Related U.S. Application Data
[63] Continuation-in-part of Ser. No. 756,403, Aug. 30, 1968, abandoned.

[52] U.S. Cl..... 260/471 C, 260/501.19, 260/558 H, 260/558 D, 260/558 R, 260/558 S, 424/300, 424/324
[51] Int. Cl. .......................................... C07c 125/06
[58] Field of Search ................... 260/471 C, 558 R, 260/558 D, 558 S, 558 A

[56] References Cited
UNITED STATES PATENTS
3,481,980  12/1969  Teitel et al..................... 260/471 C Primary Examiner—Lorraine A. Weinberger
Assistant Examiner—L. Arnold Thaxton
Attorney—Elmer J. Lawson, B. Woodrow Wyatt, Thomas L. Johnson, Robert K. Bair, William G. Webb, Frederik W. Stonner, Theodore C. Miller, Roger T. Wolfe and Lynn T. Fletcher

[57] ABSTRACT

N,N'-alkylenebis(4-Q-benzamides) where alkylene has from seven to 10 carbon atoms inclusive, having endocrinological properties, are prepared preferably by reacting an alkylenediamine with a 4-Q-benzoyl halide where Q is lower-alkyl, trifluoromethyl, trichloromethyl, trifluoromethylthio, trichloromethylthio, lower-alkylamino, di-(lower-alkyl)amino or N-(benzyloxycarbonyl)-N-(lower-alkyl)-amino.

10 Claims, No Drawings

N,N'-ALKYLENEBIS (4-SUBSTITUTED-BENZAMIDES)

This application is a continuation-in-part of my co-pending application Ser. No. 756,403, filed Aug. 30, 1968 and now abandoned.

This invention relates to compositions of matter known in the art of chemistry as N,N'-alkylenebis(benzamides) and to their preparation.

The invention resides in compounds having formula I

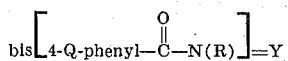

where Q is lower-alkyl, trifluoromethyl, trichloromethyl, trifluoromethylthio, trichloromethylthio, lower-alkylamino or di-(lower-alkyl)amino, R is hydrogen or lower-alkyl, and Y is alkylene having from seven to ten carbon atoms inclusive and having at least seven carbon atoms between its two connecting linkages. The compounds of this invention, when tested according to standard endocrinological evaluation procedures in animals, have been found to increase adrenal weight in rats. This weight increase is in large part, if not entirely, due to accumulation of cholesterol and/or cholesterol esters, and evidences inhibition of adrenal steroidogenesis. This inhibition of adrenal steroidogenesis is useful as an aid in diagnosis of adrenal function by procedures known to endocrinologists. Examples of compounds known to have this property of inhibiting adrenal steroidogenesis and which have been used in this way as an aid in diagnosis of adrenal function are amphenone, aminoglutethimide and metyrapone. The compounds of the invention where Q is lower-alkylamino or di-(lower-alkyl)amino also were found to be useful in having antifertility activity, as determined by standard endocrinological evaluation procedures in animals.

"Lower-alkyl," as used herein, is an alkyl radical, preferably having from one to six carbon atoms, which can be arranged as straight or branched chains, including, for instance, but without limiting the generality of the foregoing, methyl, ethyl, n-propyl, isopropyl, 2-butyl, isobutyl and n-hexyl.

"Alkylene," as used herein, as designated by Y in formula I, is an alkylene radical having from seven to ten carbon atoms and having at least seven carbon atoms between its two connecting linkages, illustrated by

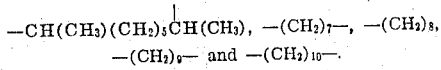

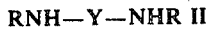

"Halo," as used herein, is a halo radical consisting of chloro, fluoro, bromo and iodo.

The compounds of formula I except those where Q is lower-alkylamino are prepared by reacting a diamine of formula II

RNH—Y—NHR  II with a 4-Q-benzoylating agent, preferably with at least two molar equivalents of a 4-Q-benzoyl halide where R and Y are defined as above in the definition of formula I. Other 4-Q-benzoylating agents are noted hereinbelow.

The compounds of formula I where Q is lower-alkylamino are prepared by reacting a diamine of formula II with an N-(benzyloxycarbonyl)-N-(lower-alkyl)-4-aminobenzoic acid and then catalytically hydrogenating the resulting N,N'-alkylenebis<4-[N-(benzyloxycarbonyl)-N-(lower-alkyl)]- aminobenzamide>, i.e., the compounds of formula I where Q is N-(benzyloxycarbonyl)-N-(lower-alkyl)amino, to remove the benzyloxycarbonyl group.

Said compounds of formula I where Q is N-(benzyloxycarbonyl)-N-(lower-alkyl)amino also constitute another aspect of the invention.

The intermediate N-(benzyloxycarbonyl)-N-(lower-alkyl)-4-aminobenzoic acids are readily prepared by conventional means, as illustrated hereinbelow, by reacting the corresponding known 4-(lower-alkylamino)benzoic acid with carbobenzyloxy chloride in the presence of an acid-acceptor, e.g., potassium bicarbonate.

The compounds of formula I where Q is lower-alkylamino or di-(lower-alkyl)amino are useful in the free base form or in the form of their acid-addition salts, and both forms are within the purview of the invention, and are considered to be one and the same invention. The acid-addition salts are simply a more convenient form for use; and, in practice, use of the salt form inherently amounts to use of the base form. The acids which can be used to prepare the acid-addition salts are preferably those which produce, when combined with the free base, pharmaceutically acceptable salts, that is, salts whose anions are relatively innocuous to the animal organism in pharmaceutical doses of the salts, so that the beneficial properties inherent in the free base are not vitiated by side effects ascribable to the anions; in other words, the latter do not substantially affect the pharmaceutical properties inherent in the cations. Appropriate pharmaceutically acceptable salts within the scope of the invention are preferably those derived from mineral acids such as hydrochloric acid, hydrobromic acid, hydriodic acid, nitric acid, phosphoric acid, sulfamic acid, and sulfuric acid; and organic sulfonic acids such as methanesulfonic acid, ethanesulfonic acid, benzenesulfonic acid, p-toluenesulfonic acid, naponic acid (1,4-naphthalenedisulfonic acid), and the like, giving the hydrochloride, hydrobromide, hydriodide, nitrate, phosphate, sulfamate, sulfate, methanesulfonate, ethanesulfonate, benzenesulfonate, p-toluenesulfonate and naponate, respectively.

The acid-addition salts are prepared preferably by reacting the free base and acid in an organic solvent, e.g., ethanol, 2-propanol, acetone, etc., in which case the salt separates directly or can be obtained by concentration of the solution.

The nature of the starting materials, mode of synthesis, results of elementary analyses, examination of the final products of formula I by infrared and nuclear magnetic resonance spectrographic analyses, all taken together, confirm the molecular structure assigned to these compounds.

The manner and process of making and using the invention will now be generally described so as to enable a person skilled in the art of medicinal chemistry to make and use the same, as follows:

The intermediates diamines and Q-benzoyl halides are either commercially available or are readily prepared using known starting materials, e.g., from the corresponding Q-benzoic acids, and using known methods, as illustrated hereinbelow in the specific examples.

The final products, as illustrated by formula I, are prepared by reacting the appropriate diamine of formula II with a 4-Q-benzoyl halide in the presence of an acid-acceptor, that is, a basic substance capable of neutralizing the hydrogen halide formed by the reaction, for example, an alkali carbonate, preferably sodium carbonate or potassium carbonate, an alkali hydroxide, preferably sodium hydroxide or potassium hydroxide. The reaction was carried out preferably by carefully mixing the reactants while cooling (to about 0° to 10°C.) and stirring in a medium comprising water and a suitable water-immiscible organic solvent inert under the reaction conditions, e.g., ethylene dichloride, chloroform, methylene dichloride, benzene, ether, and the like; the reaction mixture preferably was then allowed to warm up to room temperature and to stand with stirring until the reaction was completed.

Alternatively, other benzoylating agents can be used in place of said 4-Q-benzoyl halides in the process of the invention. For example, the reaction can be run by heating a lower-alkyl 4-Q-benzoate with a diamine of formula II or by reacting a 4-Q-benzoic anhydride with said diamine to form the final products of formula I, said reaction preferably being carried out in the presence of a suitable solvent as illustrated below in this paragraph. Also, the products of formula I are obtained by heating said diamine with a 4-Q-benzoic acid either in the absence of presence of a suitable solvent, for example, dimethylformamide, tetrahydrofuran, benzene, ethylene dichloride, and the like, and either in the absence or presence of dicyclohexylcarbodiimide.

The best mode contemplated for carrying out the invention will now be set forth as follows:

1. N,N'-Heptamethylenebis(4-ethylbenzamide) - A mixture containing 30 g. of 4-ethylbenzoic acid and 75 ml. of thionyl chloride was heated on a steam bath for two and one half hours. The excess thionyl chloride was distilled off at atmospheric pressure. Ethylene dichloride was added and distilled off at atmospheric pressure. Ethylene dichloride was added again and was distilled off in vacuo on a steam bath. The remaining 4-ethylbenzoyl chloride was dissolved in 150 ml. of ethylene dichloride and the resulting solution was added with stirring to a cooled mixture containing 11.7 g. of 1,7-heptanediamine, 200 ml. of 10% aqueous potassium hydroxide solution and 500 ml. of ethylene dichloride. The resulting white precipitate was collected by vacuum filtration using a sintered glass funnel. The white solid was recrystallized from acetonitrile and dried in a vacuum oven at 60°C. to yield 25.7 g. of N,N'-heptamethylenebis-(4-ethylbenzamide), m.p. 162°–163°C.

The above product also is prepared by heating, preferably in a suitable solvent, e.g., ethylene dichloride or benzene, 1,7-heptanediamine and either 4-ethylbenzoic anhydride, ethyl 4-ethylbenzoate or 4-ethylbenzoic acid, the latter optionally being used in conjunction with dicyclohexylcarbodiimide.

2. N,N'-Heptamethylenebis(4-tert-butylbenzamide), m.p. 166°–168°C., 7.2 g., was prepared as in Example I using 4tert-butylbenzoyl chloride (from 27.6 g. of 4-tert-butyl-benzoic acid), 9.1 g. of 1,7-heptanediamine, 500 ml. of ethylene dichloride and 200 ml. of 10% potassium hydroxide solution.

3. N,N'-heptamethylenebis(4-methylbenzamide) - To a cooled and stirred mixture containing 9.1 g. of 1,7-heptanediamine, 10 ml. of chloroform, 20 g. of sodium bicarbonate and 100 ml. of water was added dropwise over a period of about forty minutes a solution containing 28 g. of 4-methylbenzoyl chloride in 100 ml. of chloroform. The resulting mixture was then stirred for about three hours at room temperature. The reaction mixture was filtered and the chloroform layer of the filtrate was separated, dried over anhydrous calcium sulfate and evaporated to remove the chloroform. The residue was recrystallized twice from dry acetone to yield 11.5 g. of N,N'-heptamethylenebis(4-methylbenzamide), m.p. 148.0°–150.2°C. (corr.).

4. N,N'-Heptamethylenebis[4-(trifluoromethylthio)-benzamide]- A mixture containing 33.3 g. of 4-(trifluoromethylthio)benzoic acid and 80 ml. of thionyl chloride was heated on a steam bath for three hours and the excess thionyl chloride then distilled off at atmospheric pressure. Ethylene dichloride was added and distilled off at atmospheric pressure. Ethylene dichloride was again added and distilled off in vacuo. The remaining 4-(trifluoromethylthio)benzoyl chloride was dissolved in 150 ml. of ethylene dichloride and added slowly with stirring to a cooled mixture containing 7.8 g. of 1,7-heptanediamine, 200 ml. of 10% potassium hydroxide solution and 500 ml. of ethylene dichloride. The reaction mixture was then stirred while allowing it to warm up to room temperature. The white precipitate was collected by vacuum filtration through a sintered glass funnel, washed once with water, recrystallized from acetonitrile and dried in vacuo at 60°C. to yield 21.3 g. of N,N'-heptamethylenebis[4-(trifluoromethylthio)benzamide]m.p. 145°–147°C.

5. N,N'-Heptamethylenebis(4-trifluoromethylbenzamide) - To a stirred and cooled mixture containing 7.9 g. of 1,7-heptanediamine, 100 ml. of water and 250 ml. of ethylene dichloride was added simultaneously one solution containing 20 ml. of 35 percent aqueous sodium hydroxide solution and 20 ml. of water and a second solution containing 25 g. of 4-trifluoromethylbenzoyl chloride in 50 ml. of ethylene dichloride. The addition took about 25 minutes and the temperature of the reaction mixture was kept at about 5°–10°C. using an ice bath. The ice bath was removed and the reaction mixture stirred for about 2 hours. The precipitated product was collected and slurried in 600 ml. of acetone at reflux for 1 hour and the mixture then allowed to cool. The product was recrystallized from 250 ml. of methanol, was washed successively with 20 ml. of methanol and 20 ml. of n-pentane and dried in vacuo at 70°C. to yield 23 g. of N,N'-heptamethylenebis(4-trifluoromethylbenzamide), m.p. 172.0°–175.8°C. (corr.).

6. N,N'-Heptamethylenebis(4-dimethylaminobenzamide) - A mixture containing 19.8 g. of 4-dimethylaminobenzoic acid and 6.5 g. of 1,7-heptanediamine was heated slowly until the reaction temperature reached 290°C. The reaction mixture was then allowed to cool and the glassy material was dissolved in warm chloroform. The chloroform solution was allowed to cool to room temperature; it was then washed successively with water (three times) to remove any unreacted diamine, with 5% aqueous potassium hydroxide to remove the excess 4-dimethylaminobenzoic acid and again with water (twice) until the washings were neutral. The chloroform solution was then mixed with anhydrous magnesium sulfate and decolorizing charcoal, and the mixture stirred and filtered. The filtrate was evaporated in vacuo to remove the chloroform thereby yielding an oily residue which begin to crystallize. About 300 ml. of acetonitrile was added and the mixture heated to boiling on a steam bath. To the boiling solution was added decolorizing charcoal and infusorial earth, and the hot mixture was filtered through infusorial earth. The filtrate was cooled in an ice bath. The separated solid was collected and dried in vacuo overnight to yield 10 g. of N,N'-heptamethylenebis(4dimethylaminobenzamide), m.p. 155°–156°C.

Following the procedure described in Example 1 using the appropriate 4-Q-benzoyl chloride and alkylenediamine, the following compounds are prepared:

7. N,N'-Heptamethylene-N,N'-dimethylbis(4-ethylbenzamide).
8. N,N'-Nonamethylenebis(4-methylbenzamide).
9. N,N'-Decamethylenebis(4-n-hexylbenzamide).
10. N,N'-Octamethylenebis(4-ethylbenzamide).
11. N,N'-Octamethylenebis4-diethylaminobenzamide).
12. N,N'-(1,7-Dimethylheptamethylene)bis(4-ethylbenzamide).
13. N,N'-(1,5-Dimethyloctamethylene)bis(4-ethylbenzamide).
14. N,N'-(1,1,5-Trimethylheptamethylene)bis(4-ethylbenzamide).
15. N,N'-Heptamethylenebis(4-trichloromethylbenzamide).
16. N,N'-Heptamethylenebis(4-trichloromethylthiobenzamide).
17. N,N'-Heptamethylenebis(4-di-n-hexylaminobenzamide).
18. N,N'-Heptamethylenebis(4-diethylaminobenzamide) - A mixture containing 13.0 g. of 1,7-heptanediamine and 48.6 g. of ethyl 4-diethylaminobenzoate was heated on a hot plate until liquid and then 11.9 g. of sodium methoxide was added with stirring. The mixture was heated with stirring until it became pasty and had to be stirred manually. The reaction mixture was then allowed to cool slowly to room temperature and was washed by trituration with warm water until the wash water was no longer basic. As much as possible of the last wash water was decanted and acetonitrile was slowly added with rapid stirring. When dissolution was complete, the solution was cooled in an ice bath whereupon crystalline material separated. The crystalline product was collected and the filtrate concentrated in vacuo to remove the solvent. The residue, as above, was stirred with acetonitrile, the solution cooled, and the resulting crystalline product was collected. The solvent was removed from the filtrate as above and the residue was treated with acetonitrile as above to yield a third fraction of the white crystalline product. The three fractions of white product all melted at 134°–136°C. and analyzed satisfactorily for N,N'-heptamethylenebis(4-diethylaminobenzamide).

19. N,N'-Heptamethylenebis(4-n-propylbenzamide) - A mixture containing 10.6 g. of 4-n-propylbenzoic acid and an excess of thionyl chloride was heated on a steam bath with stirring for 4 hours. The excess thionyl chloride was distilled off, ethylene dichloride was added and then distilled off in vacuo. The remaining oil was dissolved in 100 ml. of ethylene dichloride and was added dropwise with stirring and cooling to a mixture containing 3.9 g. of 1,7-heptanediamine, 75 ml. of 10% aqueous potassium hydroxide solution and 250 ml. of ethylene dichloride. The reaction mixture was stirred for an additional 1 hour after addition had been completed and then allowed to stand overnight. The ethylene dichloride layer was separated, dried over anhydrous magnesium sulfate and then evaporated in vacuo in a steam bath to remove the ethylene dichloride. The solid residue was recrystallized from isopropyl acetate with decolorizing charcoal and then dried overnight in a vacuum oven at 60°C. to yield 4.7 g. of N,N'-heptamethylenebis(4-n-propylbenzamide), m.p. 131°–132°C.

20. N,N'-Heptamethylenebis(4-methylaminobenzamide) - A mixture containing 55.7 g. of N-(benzyloxycarbonyl)-N-methyl-4 aminobenzoic acid and an excess of thionyl chloride was heated at reflux on a steam bath for 2 hours and then allowed to stand overnight. The excess thionyl chloride was distilled off at atmospheric pressure, ethylene dichloride was added and also distilled off at atmospheric pressure. Ethylene dichloride was again added and then removed in vacuo on a steam bath. The remaining orange oil was dissolved in 100 ml. of ethylene dichloride and the solution added with stirring and cooling to a mixture containing 11.7 g. of 1,7-heptanediamine, 300 ml. of 10% potassium hydroxide solution and 400 ml. of ethylene dichloride. After completion of the addition, the mixture was stirred for one hour without cooling. The separated solid was collected by filtration using a sintered glass funnel. The solid was then recrystallized from about 1,500 ml. of methanol using decolorizing charcoal and dried in a vacuum oven at 60°C. to yield 40.1 g. of N,N'-heptamethylenebis <4 -[N-(benzyloxycarbonyl)-N-methyl]-aminobenzamide>, m.p. 148°–151°C.

A mixture containing 40.1 g. of N,N'-heptamethylenebis <4-[N-(benzyloxycarbonyl)-n-methyl]-aminobenzamide>, 1,500 ml. of absolute ethanol and 5 g. of 10% palladium-on-charcoal was hydrogenated in a stainless steel bomb at 24°C. using an initial pressure of 230 P.S.I. (final pressure of 200 P.S.I.) and a reaction period of about 5 hours. The catalyst was removed from the reaction mixture by filtration through infusorial earth and the clear colorless filtrate was evaporated in vacuo on a steam bath to remove the solvent. To the gummy orange residue was added 6N hydrochloric acid and the mixture was heated on a steam bath until the residue dissolved (minimum amount of hot HCl used). Decolorizing charcoal and infusorial earth were added and the mixture was filtered through infusorial earth and the filtrate was cooled in an ice bath. The resulting white precipitate was collected by vacuum filtration on a sintered glass funnel, was washed with acetone and then was dried in a vacuum oven overnight at 80°C. The solid was recrystallized a second time from methanol (about 1,500 ml. used) using decolorizing charcoal and dried overnight in a vacuum oven at 80°C. to yield 13.5 g. of N,N'-heptamethylenebis(4-methylaminobenzamide)dihydrochloride, m.p. 225°–227°C.

A sample of the above product in free base form, m.p. 100°–103° C., was prepared by treating a solution of it in acetonitrile with concentrated ammonium hydroxide, shaking the mixture thoroughly, separating the acetonitrile layer, removing the acetonitrile in vacuo and then dissolving the residue in a minimal amount of hot acetonitrile and allowing the solution to cool slowly with stirring whereupon a crystalline product in free base form separated. After the mixture had been cooled further in an ice bath, the product was collected and dried.

The above intermediate N-(benzyloxycarbonyl)-N-methyl-4-aminobenzoic acid was prepared as follows: A 45.3 g. portion of 4-methylaminobenzoic acid was added slowly with stirring to a solution containing 100 g. of potassium bicarbonate in one liter of water. To the resulting mixture was added slowly the stirred 102.6 g. of carbobenzyloxy chloride, whereupon a white solid formed, and stirring was continued overnight. The reaction mixture was then heated on a steam bath for six hours and allowed to stand over the weekend. To the reaction mixture, which had then practically solidified, was added one liter of water and the mixture was heated on a steam bath to effect dissolution. Infusorial earth was added and the mixture was filtered through infusorial earth to remove oily material. The clear filtrate was carefully acidified with 6N hydrochloric acid and the resulting precipitate was collected by vacuum filtration on a sintered glass funnel. The wet solid was dissolved in a mixture of acetone, ether and benzene and the solution evaporated to dryness in vacuo on a steam bath. The tan powder that remained was crystallized from benzene using decolorizing charcoal and then dried for 3 hours in a vacuum oven at 85°C. to yield 55.7 g. of N-(benzyloxycarbonyl)-N-methyl-4-aminobenzoic acid.

Following the procedure described in Example 20 using the appropriate N-(benzyloxycarbonyl)-N-(lower-alkyl)-4-aminobenzoic acid in place of N-(benzyloxycarbonyl)-N-methyl-4-aminobenzoic acid and using the appropriate alkylenediamine in place 1,7-heptanediamine followed by removal of the benzyloxycarbonyl group under catalytic hydrogenation conditions, the following compounds are prepared:

21. N,N'-Heptamethylenebis(4-ethylaminobenzamide).
22. N,N'-Heptamethylenebis(4-n-propylaminobenzamide).
23. N,N'-Heptamethylenebis(4-isopropylaminobenzamide).
24. N,N'-Heptamethylenebis(4-n-butylaminobenzamide).
25. N,N'-Heptamethylenebis(4-isobutylaminobenzamide).
26. N,N'-Heptamethylenebis(4-n-hexylaminobenzamide).
27. N,N'-Octamethylenebis(4-methylaminobenzamide).
28. N,N'-Nonamethylenebis(4-methylaminobenzamide).
29. N,N'-Decamethylenebis(4-methylaminobenzamide).

The intermediate N-(benzyloxycarbonyl)-N-(lower-alkyl)-4-aminobenzoic acids used in Examples 21–26 inclusive are prepared as in Example 20 using the appropriate known 4-(lower-alkylamino)-benzoic acid in place of 4-methylaminobenzoic acid.

The adrenal hypertrophy activity of the compounds of the invention was determined by the following standard test procedure: Adult intact female rats of the Sprague-Dawley strain are housed in individual cages and a daily record is kept of food consumption and cyclic vaginal cellular characteristics. The compound to be tested is dissolved in cottonseed oil or physiological saline and is administered subcutaneously or orally dialy, 6 days a week for 2 weeks. Body weights are taken on the first, seventh and 15th day of the test. All rats are autopsied on the 15th day within 24 hours after the last injection. The adrenals and other glands are removed and weighed. When desirable, tissues are fixed in Zenkers-formalin. When tested by this procedure, the compounds of the invention were found to produce increases in adrenal weights from about 30% to about 100% at dose levels ranging from about 50 to 100 mg. per kg. per day. The same effect was found in male rats.

To show that the above-noted increases in adrenal weights is due in large part to the accumulation of cholesterol and/or cholesterol esters, standard steroid test procedures are used. The adrenal glands of the rats tested with the compounds of the invention are excised, cleaned, weighed and assayed for total and free cholesterol levels according to the procedure of Leffler [Am. J. Clin. Path. 31, 310 (1959)]. It is noted that the accumulated cholesterol and/or cholesterol esters in the adrenal glands treated with the compounds of the invention imparts to said glands a yellowish white color, the presence of which is useful as an indication of said accumulated steroids.

The antifertility activity of the compounds of the invention where Q is lower-alkylamino or di-(lower-alkyl)amino was determined by the following standard test procedure which involves female rats which are medicated prior to, during and after mating period. The rats are autopsied on the fourteenth post mating day and the uteri are examined for evidence of pregnancy. The procedural details are as follows: A colony of sexually mature female rats of the Sprague-Dawley strain weighing 200–300 gms. are maintained on routine laboratory care. Daily vaginal smears are examined to record the cyclic characteristics of each rat. A given test is composed of rats which have exhibited a minimum of three coincidental estrus cycles. Three days prior to an expected estrus the rats to be placed on test are grouped, housed individually and placed on medication. The medication consists of a test compound, prepared as a solution or suspension in a suitable vehicle, administered orally via stomach tube once daily for a total of eight medications in a 10 day period (Sunday medications are omitted). One group receives only the vehicle in a like manner to serve as a control. Late in the afternoon of the day preceding the expected estrus a mature proven fertile male is housed with each female overnight. The following morning all males are removed and a vaginal smear of each female is examined for the presence of spermatozoa as evidence that insemination has occurred. Medication of all inseminated rats is continued through the seventh post insemination day. The rats are autopsied seven days after the last medication and the uteri removed and examined for evidence of pregnancy. The number of implantation sites, number of resorption sites, total number fetuses and the number of viable fetuses are recorded. When tested by this procedure, the compounds of the invention were found to have antifertility activity at dose levels ranging from about 100 to 400 mg. per kg. per day.

The actual determination of the numerical adrenal hypertrophy or antifertility data definitive for a particular compound is readily obtained by the standard test procedure referred to above by technicians versed in endocrinological test procedures, without any need for any extensive experimentation.

The compounds of the invention can be prepared for use by conventional pharmaceutical procedures: that is, by dissolving or suspending them in a pharmaceutically acceptable vehicle, e.g., aqueous alcohol, glycol, oil solution, or oil-water emulsion, for parenteral or oral administration; or by incorporating them in unit dosage form as tablets or capsules for oral administration either alone or in combination with conventional adjuvants, e.g., calcium carbonate, starch, lactose, talc, magnesium stearate, gum acacia, and the like.

I claim:

1. 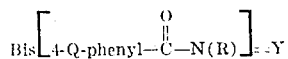

where Q is lower-alkyl, trifluoromethyl, trichloromethyl, trifluoromethylthio, trichloromethylthio, lower-alkyl-amino, di-(lower-alkyl)-amino or N-(benzyloxycarbonyl)-N-(lower-alkyl)-amino, R is hydrogen or lower-alkyl having from one to six carbon atoms and Y is alkylene having from seven to 10 carbon atoms inclusive and having at least seven carbon atoms between its two connecting linkages.

2. A compound according to claim 1 where R is hydrogen and Y is heptamethylene.

3. A compound according to claim 2 where Q is methyl.

4. A compound according to claim 2 where Q is ethyl.

5. A compound according to claim 2 where Q is trifluoromethyl.

6. A compound according to claim 2 where Q is trifluoromethylthio.

7. A compound according to claim 2 where Q is dimethylamino.

8. A compound according to claim 2 where Q is diethylamino.

9. A compound according to claim 2 where Q is methylamino.

10. A compound according to claim 2 where Q is N-(benzyloxycarbonyl)-N-methylamino.

* * * * *